Patented Sept. 2, 1952

2,609,371

UNITED STATES PATENT OFFICE 2,609,371

CARBOCYANINE DYES

John Charles Firestine, South River, N. J., assignor to E. I. du Pont de Nemours & Company, Wilmington, Del., a corporation of Delaware No Drawing. Application December 20, 1949, Serial No. 134,146

5 Claims. (Cl. 260—240.65)

1

This invention relates to 5-carboxybenzoxazole carbocyanine dyes and to their preparation and use. More particularly it relates to 5-carboxybenzoxazole carbocyanine dyes which has a hydrocarbon group substituted on the central carbon atom of the trimethine chain. The invention also relates to intermediates for the preparation of such cyanine dyes and to photographic silver halide emulsions containing the dyes in sensitizing amounts.

An object of this invention is to provide a new class of benzoxazole carbocyanine dyes. A further object is to provide such dyes which have good sensitizing properties for silver halide emulsions. A still further object is to provide such dyes which do not leave an objectionable residual stain when the dyes are used in photographic silver halide emulsions. Another object of the invention is to provide new and useful colloid silver halide emulsions sensitized with the aforesaid dyes. Yet another object is to provide a practical method for preparing the aforesaid dyes and intermediates therefor. Still other objects will be apparent from the following description of the invention.

It has been found that benzoxazole carbocyanine dyes which contain a carboxylic acid substituent in the 5-position of each benzene nucleus and a hydrocarbon substituent on the central carbon atom of the trimethine chain are unique cyanine dyes in that they are good sensitizing agents for increasing the optical sensitivity of colloid silver halide emulsions. The 6,6'-carboxybenzthiazole carbocyanine ethiodide on the other hand desensitizes a gelatino silver bromochloride emulsion. The 5-carboxy dyes of this invention, moreover, do not leave an objectionable residual stain in photographic layers after the development and fixing, etc., of the exposed photographic element has been completed. The good sensitizing properties of the carbocyanine dyes of this invention are somewhat surprising in view of the fact that they contain carboxy groups which are substituents of high electronegativity. Cyanine dyes which contain other electronegative groups are not useful as practical photographic sensitizers. For example, dyes containing a —NO2 group are strong desensitizers and dyes containing an F group or a —SO2NH2 group are relatively poor sensitizers.

The novel dyes of this invention may be represented by the following structural formula:

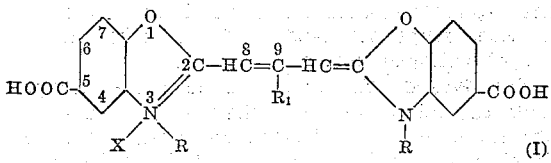

(I)

where R is an alkyl radical of 1 to 12 carbon

2 atoms or is a benzyl radical, R1 is a hydrocarbon radical, e. g., methyl, ethyl, propyl, isopropyl, hexyl, dodecyl, phenyl, naphthyl, and benzyl and X is the negative radical of an acid, e. g., halogen such as Cl, Br and I: perchlorate, SCN, p-toluene sulfonate, methyl sulfate-, ethyl sulfate-, etc.

The dyes of forumla (I) can be made from 2-methyl-5-carboxybenzoxazole by converting this base into a cycloammonium salt with a quaternizing or salt-forming agent such as an alkyl salt or ester of an alcohol radical with a suitable acid, e. g., an alkyl halide, alkyl nitrate, alkyl perchlorate, alkyl-p-toluene sulfonate, alkyl sulfamate, benzyl halide, alkyl sulfate, etc. The cycloammonium salts of 2-methyl-5-carboxybenzoxazole may be represented by the general formula:

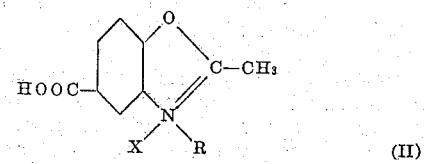

(II)

where R has the same significance in formula (I).

The cycloammonium salts of formula (II) may be converted into carbocyanine dyes of formula (I) by reacting them with an orthoester of a carboxylic acid, e. g., methyl and ethyl orthoacetate, orthopropionate, orthobenzoate, etc. When an orthoester of a saturated aliphatic mono-carboxylic acid is used, R1 is an alkyl and when an orthoester of an aromatic carboxylic acid is used R1 is an aryl radical, etc.

The salt-forming reaction and cyanine dye condensation reaction may be carried out simultaneously if desired by admixing 2-methyl-5-carboxybenzoxazole in any suitable manner with the alkyl or aralkyl salt and the orthoester of the aliphatic or aromatic carboxylic acid.

The carbocyanine dyes of formula (I) are useful photographic sensitizing dyes and may be incorporated with colloid-silver halide emulsions of various types including silver chloride, silver bromide, silver chlorobromide, silver iodobromide, simple and mixed emulsions. Various types of colloids can be used as binding agents for the light-sensitive silver halide grains, e. g., gelatin, albumin, agar agar; hydrophilic cellulose acetate, polyamides, hydrolyzed ethylene/vinyl acetate copolymers; polyvinyl alcohol, etc.

The new carbocyanine dyes can be added to emulsions in various ways. Thus, they may be added in the form of solutions. Suitable solvents are the water-miscible alcohols, e. g., methyl and ethyl alcohol, which may be substantially anhydrous or diluted with water. Dyes can be added to emulsion during any desired stage of its production in the conventional manners. However, they are preferably added to the finished emulsion before coating. They may be introduced into the emulsion layer by impregnating it with a solution of the dye, e. g., by bathing the finished layer in a bath in which the dye is dissolved. The quantity of sensitizing dye used will, of course, depend on the particular emulsion to which it is added and the particular dye used. The quantities may vary from 5 to 30 or more milligrams per kilogram of fluid emulsion containing about 9% gelatin, 4.5% silver halide and the rest water.

The preparation of 2-methyl-5-carboxybenzoxazole will now be described.

2-Methyl-5-carboxybenzoxazole

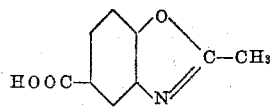

To 100 grams (0.653 mol) of 3-amino-4-hydroxybenzoic acid, there was carefully added 150 grams (1.47 mols) of acetic anhydride. The mixture was refluxed gently for 15 minutes. During the operation a solid crystallized out of the mixture at first, and then gradually went back into solution as heating continued. Acetic acid and acetic anhydride were distilled off slowly at atmospheric pressure. The distilled acetic acid-acetic anhydride mixture was poured back into the distilling flask, and the mixture was subjected to redistillation. This step was taken to insure completion of the ring closure. Finally the above oxazole compound was distilled having a boiling point of 230–250° C. at 2 mm. The crude material weighed 80 grams and was recrystallized from alcohol, yielding 63 grams of white solid having a melting point of 188–189° C. and the above structural formula. A second crop was obtained amounting to 14 grams. The combined material represented 44% theoretical.

| Analysis: | Calculated | Found | |
|---|---|---|---|
| Carbon | 61.00 | 60.75 | 60.75 |
| Hydrogen | 3.96 | 4.00 | 4.12 |
| Nitrogen | 7.91 | 8.00 | [1] 8.19 |

[1] Dumas.

The invention will be further illustrated but is not intended to be limited by the following examples.

Example I

Preparation of a dye having the formula:

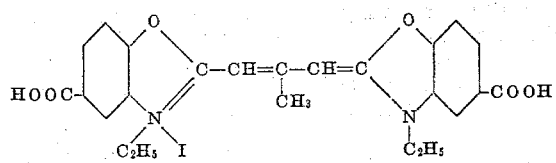

In a suitable Erlenmeyer flask were placed 8.85 grams (0.05 mol) of 2-methyl-5-carboxybenzoxazole and 7.7 grams (0.05 mol) of diethyl sulfate. The mixture was heated over a flame until it was just melted, and then was held at 140° in an oil bath for two hours. At that time 40 milliliters of dry pyridine and 15 milliliters of ethyl orthoacetate were added. The resulting mixture was refluxed for 10 minutes, a deep orange color formed and the mixture was cooled and diluted to a volume of 1000 milliliters of ether, and allowed to stand. The dye separated as an oil. The ether solution was decanted from the oily dye. One liter of approximately 2% aqueous KI solution was added to the oil and a non-dye residue which formed was filtered off. The filtrate was acidified with 20 milliliters of glacial acetic acid and an orange dye separated. It was filtered, washed with water and recrystallized from alcohol. A yield of 0.8 gram of orange dye was obtained which melted at 248° C.–251° C. This dye had its absorption maximum at 4920 A in an ethanol solution. It is useful for sensitizing colloid silver halide emulsion layers, e. g., those of the type described in Example II.

Example II

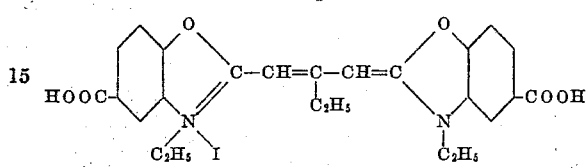

A mixture of 5.31 grams of 2-methyl-5-carboxybenzoxazole and 4.16 grams of diethyl sulfate were melted together and heated for four hours at 120°–130° C. Sixty milliliters of dry pyridine, 12 milliliters of ethyl orthopropionate and six milliliters of propionic anhydride were then added and the mixture refluxed for 20 minutes. A deep orange color formed and after cooling and adding ether the dye separated as an oil. The oil was treated with KI solution and the crude iodide salt of the dye separated out as a solid. The dye was dissolved in acetone and precipitated with ether. This operation was repeated and then the resulting dye was recrystallized twice from alcohol. A yield of 0.22 gram melting at 233°–235° C. of the dye having the above structural formula was obtained.

When this dye was added to a lithographic gelatino silver chromobromide emulsion it extended the sensitivity to 5600 A with a peak at 5300 A.

Example III

The dyes of Examples I and II can be converted into the —SCN salt by adding a water solution of KSCN or NaSCN to the ethsulfate oil of Examples I and II, separating the precipitated dye and recrystallizing it from ethanol solution.

Various other carbocyanine dyes containing different alkyl salt radicals than those described in the foregoing examples can be made in a similar manner by substituting for the diethyl sulfate other alkyl salts such as ethyl p-toluene sulfonate, methyl p-toluene sulfonate, methyl perchlorate, ethyl iodide, methyl chloride, ethyl benzenesulfonate.

The ethylethosulfate salts of the foregoing examples can be converted into other salts by a metathetical reaction, e. g., into the corresponding bromide or iodide by the addition of sodium iodide, potassium bromide, ammonium chloride, potassium thiocyanate, etc.

Similarly in place of the ethyl orthopropionate of the above examples, there may be substituted other alkyl orthoesters of aliphatic monocarboxylic acids, e. g., methyl orthoacetate, ethyl orthoacetate, ethyl ortho α thiophene carboxylate, ethyl orthobutyrate, methyl orthovalerate, orthocaproate, diethyl methyl orthocaproate, ethyl ortho-γ-phenoxy-butyrate, methyl orthophenylacetate, ethyl ortho-para-toluate, ethyl di-n-propyl orthopropionate.

The dyes of this invention, as stated above, have the advantage that they do not leave an objectionable residual stain after the exposure, development and fixing of a photographic element bearing one or more colloid silver halide emulsion layers containing one or more of such dyes has been completed. Another advantage resides in the fact that the dyes have increased solubility in solvents and can be readily introduced into emulsions. Still other advantages will be apparent from the above disclosure.

As many widely different embodiments of this invention can be made without departing from the spirit and scope thereof, it is to be understood that the invention is not to be limited except as defined by the claims.

What is claimed is:

1. The carbocyanine dyes of the formula:

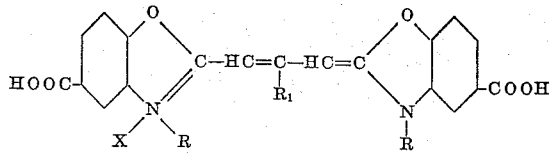

wherein R is a hydrocarbon radical taken from the group consisting of alkyl and benzyl, $R_1$ is a hydrocarbon radical and X is a negative radical of an acid.

2. A carbocyanine dye of the formula:

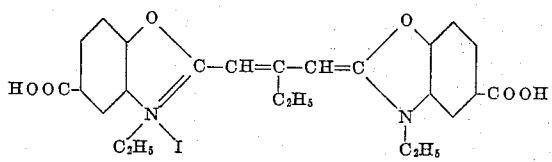

3. A carbocyanine dye having the formula:

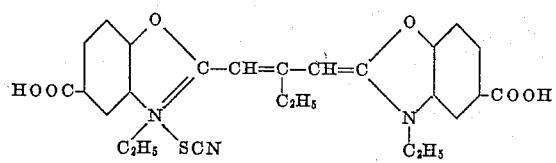

4. A carbocyanine dye of the formula:

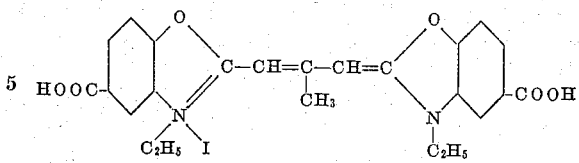

5. The carbocyanine dye of the formula:

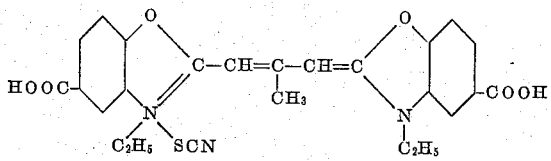

JOHN CHARLES FIRESTINE.

REFERENCES CITED

The following references are of record in the file of this patent:

UNITED STATES PATENTS

| Number | Name | Date |
|---|---|---|
| 2,166,736 | White et al. | July 18, 1939 |
| 2,263,749 | White et al. | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |

OTHER REFERENCES

Chem. Abstracts 16:3101 (Ab. of Br. Med. Journal, 1922 I 514–515).

Chem. Abstracts 19:530 (Ab. of Proc. Roy Soc., London, 96B 317–333, 1924).